United States Patent [19]
Brim

[11] Patent Number: 5,257,850
[45] Date of Patent: Nov. 2, 1993

[54] INDENTED BEDLINER FOR PICKUP TRUCK COVER ASSEMBLY

[76] Inventor: Walter L. Brim, 1500 Putter Ct., Titusville, Fla. 32780

[21] Appl. No.: 893,041

[22] Filed: Jun. 3, 1992

[51] Int. Cl.⁵ .................................... B60R 13/01
[52] U.S. Cl. .................................... 296/39.2; 296/98; 296/100
[58] Field of Search .................... 296/98, 100, 39.2

[56] References Cited

U.S. PATENT DOCUMENTS

| | | | |
|---|---|---|---|
| 4,047,749 | 9/1977 | Lambitz et al. | 296/39.2 |
| 4,563,034 | 1/1986 | Lamb | 296/98 |
| 4,792,178 | 12/1988 | Kokx | 296/98 |
| 4,807,921 | 2/1989 | Champie et al. | 296/98 |
| 5,040,843 | 8/1991 | Russell et al. | 296/98 |

*Primary Examiner*—David M. Mitchell
*Assistant Examiner*—Gary C. Hoge
*Attorney, Agent, or Firm*—Michael K. Gray

[57] ABSTRACT

An indented bedliner for a pickup truck having a first indented sidewall region which is connected to one sidewall of the pickup truck and a second indented sidewall region which is connected to the other sidewall of the pickup. Both indented sidewall regions have indented paths which are parallel to each other and which provide a path for a guide rod, the path extending over the substantial length of the truck bed. Each end of the guide rod is positioned in the indented path provided in each sidewall region. A cover is connected to the guide rod between the opposite ends of the guide rod. By moving the guide rod over the guide path provided by the indented paths on each sidewall portion of the bedliner, the truck bed can be covered or uncovered as desired.

3 Claims, 1 Drawing Sheet

INDENTED BEDLINER FOR PICKUP TRUCK COVER ASSEMBLY

BACKGROUND OF THE INVENTION

1. Field of the Invention

The present invention relates to covers for the bed of a pickup truck. More particularly, the present invention pertains to an indented bedliner which provides a path over which a guide rod attached to a cover can travel to effectively seal the truck bed of a pickup truck.

2. Discussion of the Background

The prior art discloses a number of examples of covers for truck beds. U.S. Pat. No. 4,997,227 to Falzone discloses a protective flap which is supported by a frame mounted on the bed of a pickup truck. U.S. Pat. No. 4,418,954 to Buckley discloses a foldable cover for a truck bed having a pair of support members mounted above the bed of the truck on the vehicle bed walls. U.S. Pat. No. 3,675,885 to Shute teaches a spring-loaded folding arm or cover having two pivotally connected leg portions attached to one sidewall of a truck. A spring is connected to each leg so as to urge the folding arm into a extended position as desired.

When operating a pickup truck, it is often desired to be able to cover the truck bed to protect the contents in the truck bed from rain and foul weather and to secure the contents therein from the clutches of would-be thieves. Many truck bed covers take a lengthy amount of time and actually require two individuals for purposes of properly securing the cover over a truck bed. Further, when it is desired to have the truck bed open and exposed to the air, the cover must be stored in a garage or elsewhere, which is often inconvenient.

Thus, a need exists for a device or apparatus which when used in conjunction with a cover assembly system will allow a truck bed to be easily covered or uncovered as desired.

SUMMARY OF THE INVENTION

Accordingly, one object of the present invention is to provide an indented bedliner which provides a path for a cover to be placed over or retracted from a truck bed.

Another object of the present invention is to save a user time and muscular effort when covering a truck bed and when uncovering a truck bed.

Still another object of the present invention is to provide an economical automatic truck bed cover system which is easily installed into a conventional pickup truck.

These and other valuable objects and advantages of the present invention are realized by an indented bedliner for a pickup truck which provides a path for a cover so that the cover can be easily egressed and regressed over a pickup truck bed. In that the boundaries of a truck bed are defined by a front wall, two sidewalls and a tailgate, the indented bedliner of the present invention, like in conventional bedliners, covers the truck bed, sidewalls, tailgate and front wall of a pickup truck. However, unlike conventional bedliners, the bedliner of the present invention is indented on the sidewalls to provide a path over which a guide rod connected to a cover can transverse in a forward and reverse direction so as to cover and uncover the truck bed as desired. The tailgate portion of the bedliner is likewise indented to provide a recess for the guide rod when the truck bed is fully covered.

A first indented sidewall portion of the bedliner of the present invention is connected to the interior side of one sidewall of the pickup truck. A first indented path of the first indented sidewall portion is located just below the top region of the one sidewall and extends across the one sidewall such that the first indented path is substantially perpendicular to the front wall of the truck.

A second indented sidewall portion of the bedliner is connected to the interior side of the other sidewall. A second indented path of the second indented sidewall portion is located just below the top region of the other sidewall and extends across the other sidewall such that the second indented path is substantially perpendicular to the front wall of the truck and parallel to the first indented path.

An indented tailgate portion of the bedliner is connected to the interior side of the tailgate. A recess is provided in the indented tailgate portion which is perpendicular and planar to the first and second guide paths when the tailgate is in a closed position.

For purposes of automatically activating the cover, a motor housing is connected to both sidewalls and is located proximate to the front wall of the pickup truck. The motor housing includes a supply box and a motor compartment positioned below the supply box. A rotary motor is positioned in the motor compartment for purposes of rotating a rod to which the cover is connected.

The cover is made of a suitable waterproof material which can be wound around the rotating rod. The guide rod is connected to an end of the cover which is opposite to the end of the cover to which the rotating rod is connected.

The motor housing is provided with an opening which faces in the direction of the tailgate and which is positioned at a level which is planar to the first and second indented paths. The opposite ends of the guide rod are slidably connected to the first and second indented paths. As the guide rod is urged forward, the cover will unwind from the rotating rod and extend through the opening in the motor housing. The rotary motor can be activated by a user by pressing a push-button-type control means in the front panel of the truck cab. When the rotating rod is rotated forward by the rotary motor, the ends of the guide rod glide over the first and second indented paths. When the guide rod reaches the recess in the indented tailgate portion of the bedliner, the truck bed is fully covered and the rotary motor is disengaged. Means are provided to latch the cover to the tailgate.

It should further be recognized that the indented bedliner of the present invention provides a means by which a cover can be easily egressed over or regressed from a truck bed by motorized or by manual means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

When referring to the drawings, it is realized that like reference numerals designate identical or corresponding parts throughout the respective views and figures.

DESCRIPTION OF THE INVENTION

Figure 1:
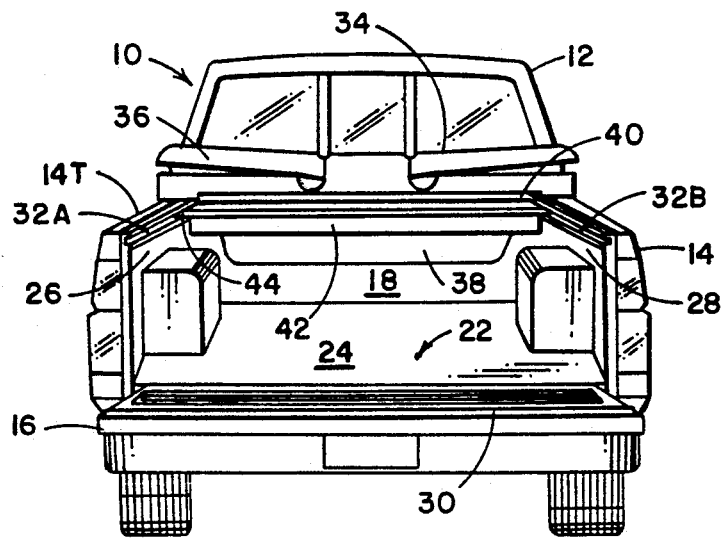
FIG. 1 is a perspective illustration of a pickup truck provided with the indented bedliner of the present invention.

With reference to FIG. 1, a rear view of a pickup truck 10 illustrates the sidewalls 14, front wall 18, and tailgate 16 (tailgate 16 being depicted in an open position) which form and define the boundaries of truck bed floor 20 (see FIG. 4) located under the floor portion 24 of the indented bedliner 22. The indented bedliner 22 is comprised of the aforementioned floor portion 24, a first indented sidewall portion 26, a second indented sidewall portion 28, and an indented tailgate portion 30. An optional front wall portion of the indented bedliner (not shown) may be connected to the front wall 18. Sidewall portions 26 and 28 are provided with indented paths 32A and 32B. The indented paths 26 and 28 are integral to the sidewall portions 26 and 28, respectively.

Still with reference to FIG. 1, a motor housing 34 is mounted atop the top regions 14T of sidewalls 14 proximate to the cab 12 and front wall 18 of the pickup truck 10. Motor housing 34 is comprised of a supply box 36 whose interior is provided with trays (not shown) for tools (not shown), and a motor compartment 38. The motor compartment 38 can be accessed by removing the tool trays. The motor compartment 38 is provided with an opening 40 through which a cover 42 may pass through. A guide rod 44 is shown positioned outside opening 40 with one end of the guide rod 44 fitting into first indented path 32A and the other end of the guide rod 44 fitting into second indented path 32B.

The first indented path 32A is located parallel to second indented path 32B and perpendicular to front wall 18. The opening 40 of motor compartment 38 is planar to indented paths 32A and 32B. As has been mentioned, the indented paths 32A and 32B are an integral part of material which comprises the respective first and second sidewall portions 26 and 28.

Figure 2:
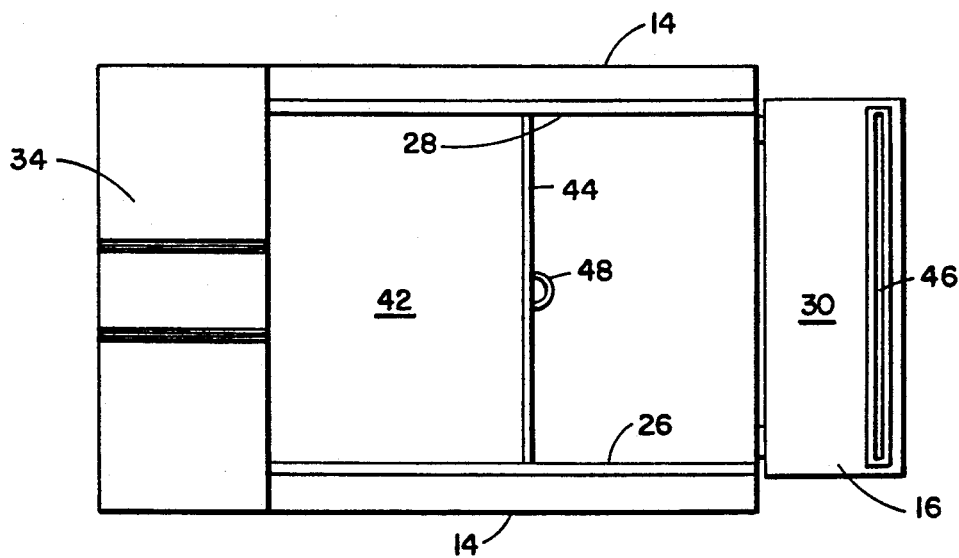
FIG. 2 is a top view schematic illustration of the pickup truck provided with the indented bedliner of the present invention.

In FIG. 2, a top view portrays the cover 42 extending out of the motor housing 34. The guide rod 44 is slidable over the indented paths 32A and 32B (not shown in FIG. 2) which are provided in the sidewall portions 28 and 26. At its maximum distance from the motor housing 34, guide rod 44 will fit into the recess 46 located at the tailgate bedliner portion 30. When the tailgate 16 is in a closed position, the recess 46 is planar with the indented paths 32A and 32B. A latching means or hook 48 is provided at the end of the cover 42 proximate to the guide rod 44 to latch onto the tailgate 16 so that the contents under the cover 42 can be secured.

Figure 3:
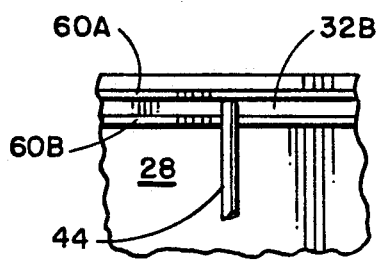
FIGS. 3 and 4 are closeup illustrations depicting how the guide rod and indented paths of the present invention connect with one another.
Figure 4:
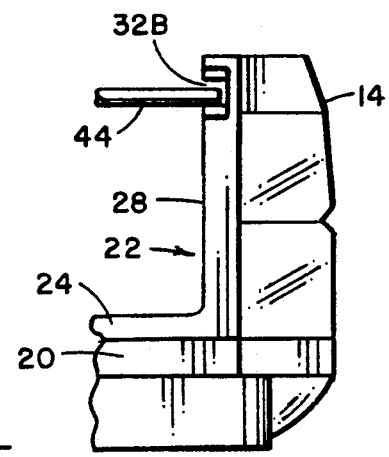

FIGS. 3 and 4 demonstrate how the guide rod 44 is interfaced with the indented paths 32A and 32B of the present invention. FIG. 3 illustrates how an end of guide rod 44 is placed into the indented path 32B. The indented path 32B is provided with weather stripping located above indicated by numeral 60A and below indicated by numeral 60B the indented path 32B.

In FIG. 4, an end view depicts the sidewall portion 28 and floor portion 24 of bedliner 32 covering the sidewall 14 and floor bed 20 of a pickup truck. The end of guide rod 44 is positioned inside the indented path 32B.

Thus, the indented paths 32A and 32B provide a guide path which allows a cover to be easily moved to a desired position by motorized or manual means. The indented bedliner of the present invention affords an economical and easily installed truck bed cover system.

The foregoing discussion is intended to be illustrative and non-limiting. Numerous changes and modifications are possible in light of the above teachings. It is therefore understood that within the scope of the appended claims, the application may be practiced otherwise than as specifically described therein.

I claim:

1. A cover assembly, for a pickup truck having a first and second sidewall, a front wall and a tailgate which define the boundaries of a truck bed of the pickup truck, said cover assembly comprising:
    a first indented path integral to a first sidewall portion of a bedliner, said first sidewall portion connecting to an interior side of one sidewall, said first indented path extending across said first sidewall portion and being substantially perpendicular to the front wall of the pickup truck;
    a second indented path integral to a second sidewall portion of said bedliner, said second sidewall portion connecting to an interior side of the other sidewall, said second indented path extending across said second sidewall portion and being in parallel with said first indented path;
    a guide rod having one end slidably connected to said first indented path and another end slidably connected to said second indented path; and
    a cover connected to said guide rod.

2. A cover assembly according to claim 1, further comprising:
    a tailgate portion connected to the interior of the tailgate and provided with a recess integral to said tailgate portion which is planar to said first and second indented paths.

3. A cover assembly according to claim 1, wherein:
    said first and second indented paths are of equal length and extend the substantial length of said first and second sidewall portions, respectively.

* * * * *